US007411996B2

(12) United States Patent
Kim

(10) Patent No.: US 7,411,996 B2
(45) Date of Patent: Aug. 12, 2008

(54) SIGNAL PATH SEARCHING METHOD AND APPARATUS THEREOF IN MOBILE COMMUNICATION SYSTEM PROVIDED WITH PLURALITY OF ARRAY ANTENNA ELEMENTS

(75) Inventor: Jeong Ho Kim, Kyonggi-do (KR)

(73) Assignee: LG-Nortel Co., Ltd, Seoul (KR)

( * ) Notice: Subject to any disclaimer, the term of this patent is extended or adjusted under 35 U.S.C. 154(b) by 951 days.

(21) Appl. No.: 10/263,831

(22) Filed: Oct. 4, 2002

(65) Prior Publication Data

US 2003/0067970 A1     Apr. 10, 2003

(30) Foreign Application Priority Data

Oct. 6, 2001     (KR) .................. 10-2001-61666

(51) Int. Cl.
*H03D 1/00*     (2006.01)
*H04L 27/06*    (2006.01)
*H04B 1/69*     (2006.01)

(52) U.S. Cl. .................. 375/148; 375/347; 375/150; 455/272

(58) Field of Classification Search .......... 375/148, 375/150, 142, 347; 455/272
See application file for complete search history.

(56) References Cited

U.S. PATENT DOCUMENTS

| 4,373,207 | A | * | 2/1983 | Hecken | 455/139 |
|---|---|---|---|---|---|
| 5,299,192 | A | * | 3/1994 | Guo et al. | 370/210 |
| 5,349,611 | A | * | 9/1994 | Varian | 375/367 |
| 5,850,438 | A | * | 12/1998 | Braams et al. | 379/386 |
| 5,878,088 | A | * | 3/1999 | Knutson et al. | 375/324 |
| 5,974,087 | A | * | 10/1999 | Nowara | 375/226 |
| 6,064,338 | A | | 5/2000 | Kobayakawa et al. | 342/378 |
| 6,075,809 | A | | 6/2000 | Naruse | 375/147 |
| 6,134,262 | A | * | 10/2000 | Kitade et al. | 375/142 |
| 6,185,440 | B1 | * | 2/2001 | Barratt et al. | 455/562.1 |
| 6,229,842 | B1 | * | 5/2001 | Schulist et al. | 375/148 |
| 6,320,899 | B1 | * | 11/2001 | Chang et al. | 375/147 |
| 6,369,757 | B1 | * | 4/2002 | Song et al. | 342/378 |
| 6,515,980 | B1 | * | 2/2003 | Bottomley | 370/342 |
| 6,628,606 | B1 | * | 9/2003 | Hong et al. | 370/208 |
| 6,813,263 | B1 | * | 11/2004 | Margherita | 370/347 |
| 2001/0021199 | A1 | * | 9/2001 | Lee et al. | 370/503 |
| 2001/0022807 | A1 | * | 9/2001 | Yotsumoto | 375/147 |
| 2001/0030997 | A1 | * | 10/2001 | Yang et al. | 375/152 |
| 2002/0064246 | A1 | * | 5/2002 | Kelkar et al. | 375/347 |
| 2002/0169578 | A1 | * | 11/2002 | Yang | 702/152 |
| 2003/0081660 | A1 | * | 5/2003 | King et al. | 375/150 |
| 2004/0009791 | A1 | * | 1/2004 | Hiramatsu | 455/561 |
| 2004/0012526 | A1 | * | 1/2004 | Casabona et al. | 342/428 |

FOREIGN PATENT DOCUMENTS

EP     1 146 657 A1     10/2001
WO     WO 01/18975 A2   3/2001

* cited by examiner

Primary Examiner—Temesghen Ghebretinsae
(74) Attorney, Agent, or Firm—Ked & Associates, LLP

(57) ABSTRACT

Disclosed is a signal path searching method in a mobile communication system provided with a plurality of array antenna elements. According to the method and apparatus, the path search is performed using a signal of a chip level or a signal of a symbol level, and it is decided whether to first perform a temporal process or a spatial process according to the level.

22 Claims, 6 Drawing Sheets

SIGNAL PATH SEARCHING METHOD AND APPARATUS THEREOF IN MOBILE COMMUNICATION SYSTEM PROVIDED WITH PLURALITY OF ARRAY ANTENNA ELEMENTS

This application claims the benefit of the Korean Application No. P01-61666 filed on Oct. 6, 2001, which is hereby incorporated by reference.

BACKGROUND OF THE INVENTION

1. Field of the Invention

The present invention relates to a mobile communication system, and more particularly, to a signal path searching method and an apparatus thereof in a mobile communication system provided with a plurality of array antenna elements.

2. Discussion of the Related Art

Generally, if a smart antenna technique is applied to a base station, a gain through an array process is produced. Thus, if the power of a signal that a mobile station transmits is reduced by 1/N (where N is the number of antenna elements) or if an additional gain obtained by nulling an interference signal, the gain is reduced by 1/N or less where the base station uses a power control mechanism, and thus the power of the signals received through respective antenna elements of the base station is reduced in proportion to N.

FIG. 1 is a view illustrating the construction of a conventional base station receiver.

Referring to FIG. 1, a conventional receiver of a base station includes a scanning correlator 101 for searching a multi-path signals, a baseband processing section 102 for down-converting frequencies of respective path signals and converting the down-converted signals into digital signals, and a combiner 103 for combining the respective signals after compensating for a delay and a phase of the digital signals for each path.

The scanning correlator 101 obtains a partial correlation value between the digital signal and a Pseudo Noise code (e.g., a scrambling code) for searching each signal path at a specific time hypothesis. If the partial correlation value exceeds a specified threshold value, the scanning correlator recognizes that there is a new communication path at the specific time hypothesis. The receiver of the base station allocates a new rake finger to the new path. Each finger obtains an energy value of a symbol in each path on a temporal axis.

The combiner 103 maximal-ratio-combines the obtained symbol energy values obtained in all the paths, and a demodulator (not illustrated) demodulates the maximal-ratio-combined values.

The scanning correlator 101 serves as a searcher, is allocated for each antenna element, and searches successively identified signal paths.

For instance, in the path search algorithm of a scanning correlator of the conventional 3G asynchronous Wideband Code Division Multiple Access (WCDMA), the chip length of a scrambling code period used in one frame (assuming 15 slots) is of 38,400 chips, and thus a chip segment corresponding to one slot is of 2560. If it is assumed that a spreading factor of a certain control channel is of 256, the partial correlation value for a period of 256 chips is obtained at each time hypothesis for checking existence/nonexistence of a new signal path.

During the search process, the scanning correlator compares the partial correlation values with a specified threshold value. If the partial correlation value is larger than the threshold value, it decides that a new signal path exists.

Herein, the specified threshold value is set so as to satisfy a false alarm probability determined in the standard. If the threshold value is set to be high, the false alarm probability is lowered, but a detection capability becomes lowered.

On the contrary, if the threshold value is set to be low, the false alarm probability is heightened, but the detection capability becomes improved.

Meanwhile, in the 3G asynchronous WCDMA system, in order to match the synchronization of the scrambling code, the base station uses a Dedicated Physical Control Channel (DPCCH) of an reverse link dedicated physical data channel (DPDCH). The DPCCH, as shown in FIG. 2, is composed of pilot symbols for estimating channel information, a Transport Format Combination Indicator (TFCI) including Spreading Factor (SF) information of a reverse link channel, a FeedBack information (FBI) that is a feedback signal including information for a transmission diversity of a mobile station, and a Transmit Power Control (TPC) field including power control information. One frame of this DPCCH is composed of 15 slots.

However, according to the frame format, the number of slots transmitted for each frame may be changed, of which an example will now be explained.

Where a mobile station should perform an inter-frequency handoff, a base station should generate at least one empty slot that has no data bits. Since the at least one empty slot is generated with a different pattern for each frame, the number of the slots which each frame includes is changed.

Accordingly, during the path search by a receiver of the base station, a transmitted signal from the mobile station still includes its square component even if it is modulated. Thus, the transmitted signal is effective on the changed number of the slots. Accordingly, if it is known which slot is empty, the corresponding slot is skipped, and the slot where the data exists is searched.

This operation is applied to the respective elements of an array antenna in the same manner as the existing system.

A base station includes two kinds of searchers. One is a random access channel (RACH) path searcher, and the other is a traffic channel path searcher. Where a mobile station performs an initial connection to the base station through an up link channel, i.e., where the mobile station transmits an originating call or a destination call to the base station through a Random Access Channel (RACH), the searcher of the base station receives at least one preamble of the RACH and then transmits a confirmation signal for the preamble through a down link channel.

Accordingly, the mobile station transmits the signal subject to transmission to the base station.

During the above process, it is required that the base station accurately searches the preamble transmitted from the mobile station. For this, the RACH searcher of the base station successively performs a search operation. Herein, the searcher has a searching window of a specified size to search the RACH preamble.

When a call is established between the mobile station and the base station, the traffic channel path searcher successively performs a search in order to know whether a new signal path exists or not.

The traffic channel path searcher receives the time hypothesis when to be searched according to a control signal of a controller. The traffic channel path searcher obtains the partial correlation value at a specific time hypothesis, and compares the partial correlation value with a threshold value. If the correlation value is larger than the threshold value, the traffic channel path searcher recognizes that a new signal exists at the specific time hypothesis. Then the traffic channel path searcher allocates this new path to a finger of the rake receiver. A combiner combines the multi-path signals to maintain the performance of the receiver in an optimum state.

At this time, the base station obtains a combined gain by a method of combining the signals received from the respective antennas using two diversity receiving antennas. That is, a receiver of the base station includes the searchers that are independently operated for the two antennas. A modem of the base station finally combines the signals received through the antennas.

As described above, the base station including the conventional RACH searcher and the traffic channel searcher performs searches of the new signal paths using the separate searchers for the receiving antennas without using spatial information of the received signal. Therefore, the performance of the receiver of the base station is maintained by the maximum ratio combination according to the searched paths.

Where the searchers identical to those of the existing system are applied to the system that adopts the smart antenna, the Signal-to-Interference & Noise Ratio (SINR) of a combination signal of signals received through one antenna satisfies the signal quality to be requested on the link channel, but each SINR of the signals received through the respective antennas is reduced.

Accordingly, the method of receiving signals using one antenna cannot avoid the deterioration of the new path search performance. Consequently, the symbol error rate of the received signals is heightened due to the late search of the signal path for the optimum combination of the signals.

If the path search is performed by using the signal received through one antenna element, the deterioration of the new path search performance also becomes severe due to decrease of a power level of the received signal. Consequently, the deterioration causes the deterioration of the performance of the rake receiver due to a long search time.

SUMMARY OF THE INVENTION

Accordingly, the present invention is directed to a signal path searching method and an apparatus thereof in a mobile communication system provided with a plurality of array antenna elements that substantially obviates one or more problems due to limitations and disadvantages of the related art.

An object of the present invention is to provide a signal path searching method and an apparatus thereof in a mobile communication system provided with a plurality of array antenna elements that is suitable for reduction of time required for a signal path search using spatial information of a received signal.

Another object of the present invention is to provide a signal path searching method and an apparatus thereof in a mobile communication system provided with a plurality of array antenna elements that is suitable for improvement of a search performance using spatial information of a received signal.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a signal path searching method in a mobile communication system provided with a plurality of array antenna elements, includes steps of (a) processing temporally despread signals of signals received through the antenna elements at a specific time, (b) spatially processing the temporally processed signals by using first estimated phase information values and second estimated phase information values, wherein the second estimated phase information are slightly increasing and/or decreasing for one among the first estimated phase information values, (c) searching a signal path existing at the specific time where each maximum value for the first and second phase information values among the spatially processed signals' values exceeds a corresponding threshold value.

In another aspect of the present invention, A signal path searching method in a mobile communication system provided with a plurality of array antenna elements includes steps of (a) processing spatially chip-level signals of signals received through the antenna elements by using first estimated phase information values and second estimated phase information values at a specific time; wherein the second estimated phase information are slightly increasing and/or decreasing for one among the first estimated phase information values, (b) temporally processing the spatially processed signals for each of the first and second phase information values of at the specific time, (c) searching a signal path existing at the specific time where a maximum value for each of the first and second phase information values among the temporally processed signals' values exceeds a corresponding threshold value.

In still another aspect of the present invention, a signal path searching apparatus in a mobile communication system provided with a plurality of array antenna elements comprises a temporal processor for processing temporally despread signals of signals received through the antenna elements at a specific time, a spatial processor for spatially processing the temporally processed signals by using first estimated phase information values and second estimated phase information values; wherein the second estimated phase information are slightly increasing and/or decreasing for one among the first estimated phase information values, a combiner for combing formed beams of signal paths searched at the specific time where each maximum value for the first and second phase information values among the spatially processed signals' values exceeds a corresponding threshold value.

In still another aspect of the present invention, A signal path searching apparatus in a mobile communication system provided with a plurality of array antenna elements, comprises (a) a spatial processor processing spatially chip-level signals of signals received through the antenna elements by using first estimated phase information values and second estimated phase information values at a specific time, wherein the second estimated phase information are slightly increasing and/or decreasing for one among the first estimated phase information values, (b) a temporal processor for temporally processing the spatially processed signals by using first estimated phase information values and second estimated phase information values at a specific time, (c) a combiner for combining formed beams of signal paths searched at the specific time where each maximum value for the first and second phase information values among the temporally processed signals' values exceeds a corresponding threshold value.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Multi-path signals incident to a base station through array antenna elements from a mobile station considered as plane waves since the distance between the mobile station and the base station is measured several hundreds of meters to several tens of kilometers.

Figure 1:
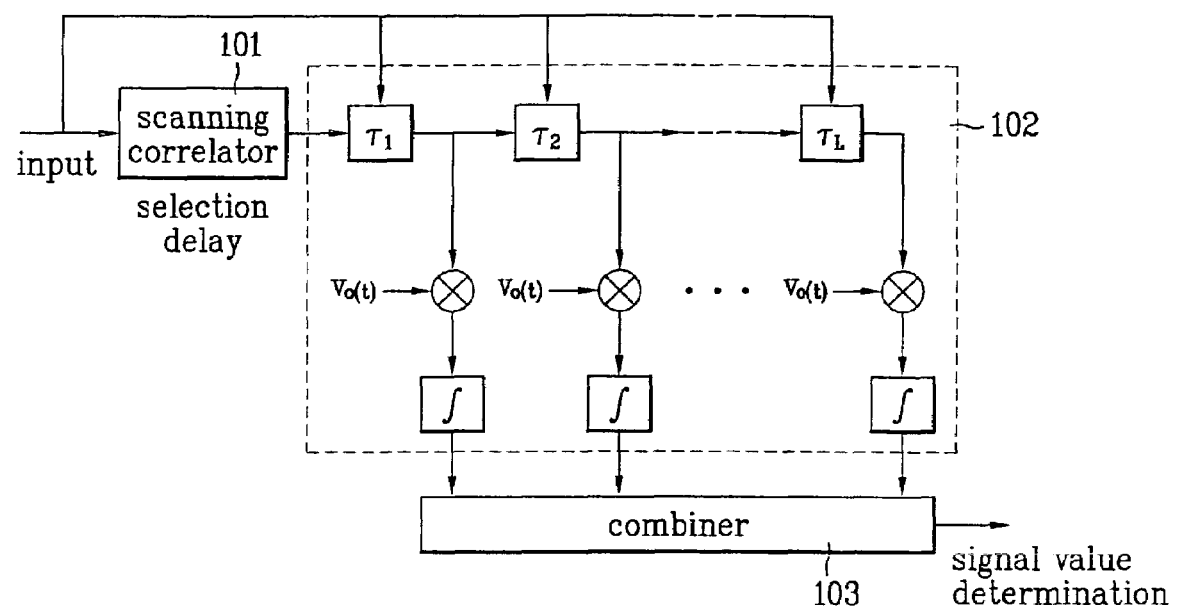
FIG. 1 is a view illustrating the configuration of a conventional base station receiver.
Figure 2:
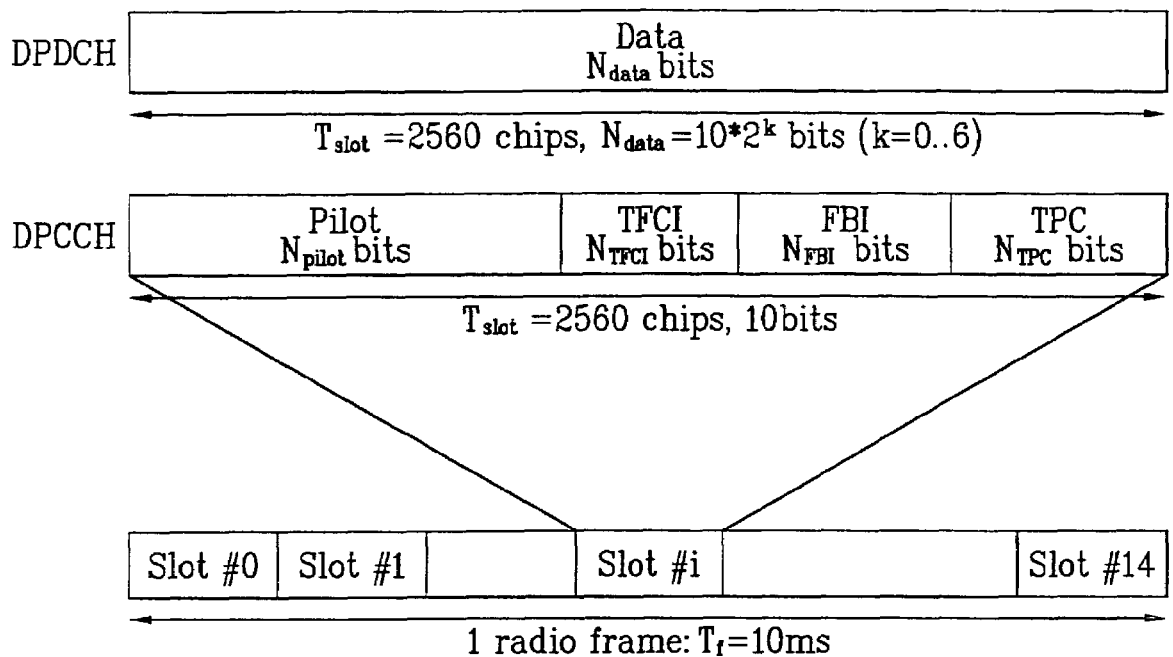
FIG. 2 is a view illustrating a general up-link signal format.
Figure 3:
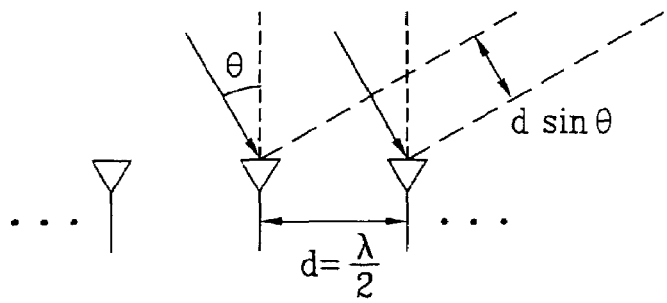
FIG. 3 is a view illustrating a path difference produced according to different arriving directions of a received signals in a general array antenna system.

In other words, since each of the multi-path signals is incident to each of the antenna elements with its phase planed, as shown in FIG. 3, each of the multi-path signals has a different path difference according to their incident directional angles. When the multi-path signals are transferred from the mobile station to the base station, the amplitudes of the multi-path signals are scarcely changed, but only their phase angles become different according to their path differences.

Accordingly, a receiver receives the multi-path signals having the same amplitude and different phase angles through adjacent antenna elements.

Herein, the distance between the antenna elements is set to a half wave ($\lambda/2$), and in this case, an antenna radiation pattern forms nulls whose number is N−1 (where, N is the number of antenna elements) where a beam is formed in a direction of a broad side.

In this case, a maximum gain is obtained in a vertical direction of the antenna surface, and a small side lobe is produced in other directions except for the vertical direction. In order to effectively suppress the multi-user's interference, the interference signal component at the receiver can be lowered to a minimum level by making nulls at a specified directional angle. This enables to design a receiver having a greatly improved receiving performance.

At this time, the path difference between the signals is determined according to directional angles at which the received signals are arrived, and a difference of a phase angle is produced due to the path difference. A signal-tracking vector for estimating the phase angle is called a signature vector.

The phase angle is linearly increased for each antenna element. This is because as an exponent of the antenna element is increased, the path difference between the signals according to the arriving directional angles of the received signals is linearly increased or decreased.

For instance, if the distance (d) between the antenna elements is a half wave ($\lambda/2$), and the wave number is $2\pi/\lambda$, the signal path difference between the first and the second antenna elements becomes d sin($\theta$), a phase angle difference is $\pi$ sin($\theta$).

As shown in FIG. 3, the signal path difference between the first and the third antenna elements is 2d sin($\theta$), the signal path difference between the first to fourth antenna elements is 3d sin($\theta$), and the signal path difference between the first and N-th antenna elements is (N−1)d sin($\theta$). Accordingly, the following signal tracking vector of the received signal (hereinafter referred to as signature vector) is obtained.

$$a(\theta)=[1, e^{-j\pi \sin \theta}, e^{-j2\pi \sin \theta}, e^{-j\pi(N-1)\sin \theta}]^T \qquad \text{[Equation 1]}$$

This signature vector represents the phase angle difference for the respective antenna elements according to the arriving direction of the signals, and the interference signal is received with this signature vector. Thus, if this signature vector information is known, a receiver of the base station can obtain one combined vector of the signals which are received through the antenna elements. Herein, the combined vector matches an incident direction of a desired signal. An SINR of a specified signal obtained from the combined vector can be heightened over N times in comparison to the case that one antenna is used.

In the present invention, since a searcher has no information on the signature vector at an initial time of the searching, it performs searches for the direction of the signal by increasing or decreasing the angle by a predetermined degree in order to find the arriving directional angles of received signals.

When the signal path is changed at an initial call connection or after the call connection, the searcher has no signature vector information for the changed path. Thus, the searcher starts to make a search by using a certain estimated value of the signal signature vector. The search can be performed through the two following embodiments.

The two following embodiments may be applied to the RACH searcher and the traffic channel searcher.

First Embodiment

Figure 4:
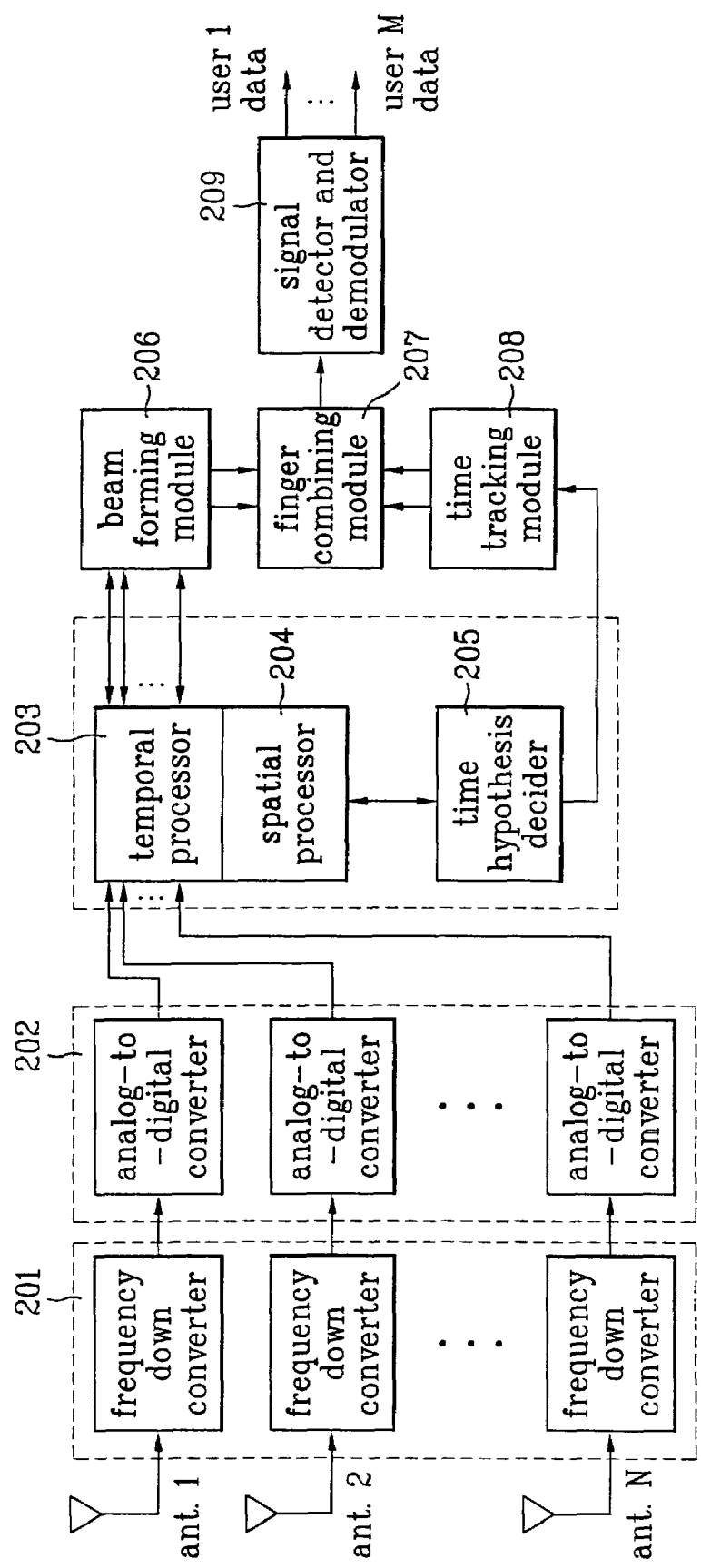
FIG. 4 is a block diagram illustrating the configuration of a temporal/spatial-processing searcher according to a first embodiment of the present invention.

FIG. 4 is a block diagram illustrating the configuration of a temporal/spatial-processing searcher according to a first embodiment of the present invention.

Figure 5:
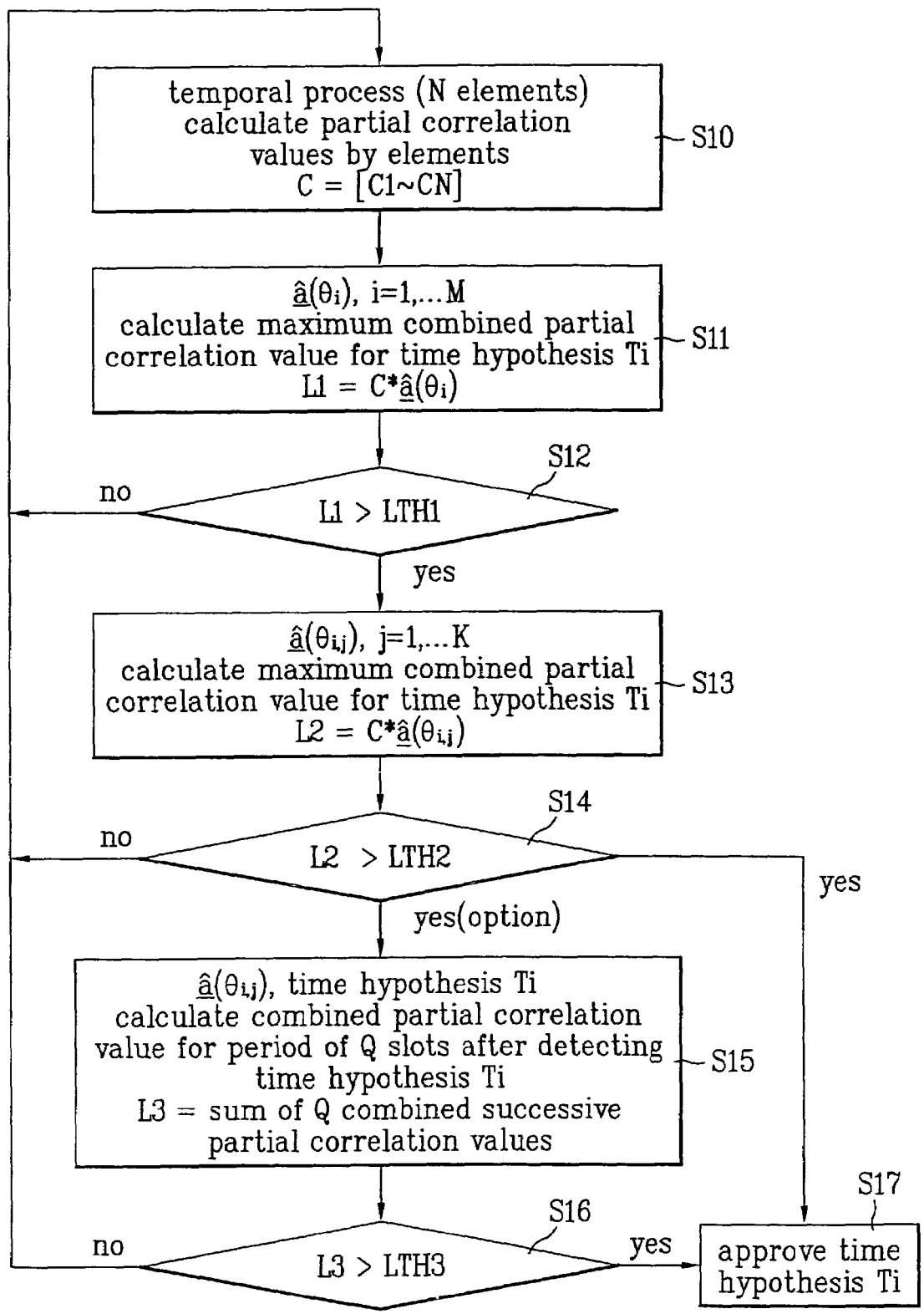
FIG. 5 is a flowchart illustrating a searching process of the temporal/spatial-processing searcher of FIG. 4.

FIG. 5 is a flowchart illustrating a searching process of the temporal/spatial-processing searcher of FIG. 4.

As shown in FIG. 4, the searcher includes a frequency down converter 201 for converting signals received through respective antenna elements into baseband signals, an analog-to-digital converter 202 for converting the analog signals of the baseband into digital signals, a temporal processor 203 for calculating partial correlation values of the digital signals and time-offset sequences of scrambling codes, a spatial processor 204 for combining the partial correlation values with predetermined signature vectors to obtain combined partial correlation values and determining a maximum combined partial correlation value among the combined partial correlation values, a time hypothesis 205 for deciding whether to approve a time hypothesis on which it is provided with the maximum combined partial correlation value, a time tracking module 208 for tracking chip level timing of the signal to be newly searched at the approved time hypothesis, a beam forming module 206 for forming a beam by applying a pre-adapted (or fixed) weight value to the partial correlation values calculated in the temporal processor 203, a finger combining module 207 for generating a beam by combining the formed beams of the paths existing in the approved time hypothesis based on a result of time tracking, and a signal detector and decoder 209 for detecting and decoding an output of the finger combining module 207.

FIG. 5 shows the signal path searching process composed of two steps. One step is a temporal process of the signals received through the respective antennas and then a spatial process of the temporally processed signals with estimated signature vectors, and the other step is a spatial process of the received signals and then a temporal process of the spatially processed signals with estimated signature vectors.

As shown in FIGS. 4 and 5, the present invention improves the search performance by spatial-processing the partial correlation values obtained from the respective antennas at a symbol level for a specified time hypothesis Ti.

Referring to FIGS. 4 and 5, the signal path searching process will be explained.

First, the signals received through the respective antenna elements are converted into digital signals of the baseband, and then passed through a matched filter (not illustrated) for matching the signals with the shape of transmitted pulses. The temporal processor 203 obtains the partial correlation values in the unit of a symbol by multiplying the matched digital signals by a scrambling code having the time-offset sequence of the up link. In other words, the temporal processor starts the initial path search using symbol values after being despread. Thereafter, the temporal processor 203 averages the partial correlation values of the symbols by the respective (i.e., N) elements (step 10) (the first temporal process). The average partial correlation values by antenna elements are represented as C=[C1~CN].

The spatial processor 204 obtains nine combined partial correlation values by respectively combining the average partial correlation values obtained from the respective antenna elements with 9 estimated signal signature vectors ($a(\hat{\theta}_i)$) of the following equations 2-1 to 2-9 at a specific time hypothesis Ti. The spatial processor 204 replaces a maximum value among the 9 combined partial correlation values with L1. The L1 is "$C*a(\hat{\theta}_i)$" (step 11). The term "i" indicates one among the estimated signature vectors for estimating the signature vector (the first spatial process).

For example, if the angle range of an area covered by the antenna is 120°, the search starts first in 9 stages. Herein, the first estimated signature vector is given as the following equation 2-1.

$$a(\hat{\theta}_1)=[1,e^{-j\pi \sin 12}, e^{-j\pi 2 \sin 12}, K, e^{-j\pi(N-1)\sin 12}]^T \quad \text{[Equation 2-1]}$$

The equation 2-1 shows one estimated signature vector where the arriving angle of the initial incident signal is assumed to be 12°. Also, other 8 estimated signature vectors are shown in the following equations 2-2 to 2-9 under the assumption that an arriving angle of other antenna elements is increased the integer number of times.

Accordingly, the estimated signature vector are obtained for every 12°, and the maximum combined partial correlation value at the time hypothesis Ti to be tested is obtained using one of their estimated signature vectors.

$$a(\hat{\theta}_2)=[1,e^{-j\pi \sin 24}, e^{-j\pi 2 \sin 24}, K, e^{-j\pi(N-1)\sin 24}]^T \quad \text{[Equation 2-2]}$$

$$a(\hat{\theta}_3)=[1,e^{-j\pi \sin 36}, e^{-j\pi 2 \sin 36}, K, e^{-j\pi(N-1)\sin 36}]^T \quad \text{[Equation 2-3]}$$

$$a(\hat{\theta}_4)=[1,e^{-j\pi \sin 48}, e^{-j\pi 2 \sin 48}, K, e^{-j\pi(N-1)\sin 48}]^T \quad \text{[Equation 2-4]}$$

$$a(\hat{\theta}_5)=[1,e^{-j\pi \sin 60}, e^{-j\pi 2 \sin 60}, K, e^{-j\pi(N-1)\sin 60}]^T \quad \text{[Equation 2-5]}$$

$$a(\hat{\theta}_6)=[1,e^{-j\pi \sin 72}, e^{-j\pi 2 \sin 72}, K, e^{-j\pi(N-1)\sin 72}]^T \quad \text{[Equation 2-6]}$$

$$a(\hat{\theta}_7)=[1,e^{-j\pi \sin 84}, e^{-j\pi 2 \sin 84}, K, e^{-j\pi(N-1)\sin 84}]^T \quad \text{[Equation 2-7]}$$

$$a(\hat{\theta}_8)=[1,e^{-j\pi \sin 96}, e^{-j\pi 2 \sin 96}, K, e^{-j\pi(N-1)\sin 96}]^T \quad \text{[Equation 2-8]}$$

$$a(\hat{\theta}_9)=[1,e^{-j\pi \sin 108}, e^{-j\pi 2 \sin 108}, K, e^{-j\pi(N-1)\sin 108}]^T \quad \text{[Equation 2-9]}$$

If L1 is larger than the predetermined threshold value LTH1 at the time hypothesis Ti (step 12), the time hypothesis decider 205 approves the time hypothesis Ti. The approval indicates that there exists a new signal path at the approved time hypothesis Ti. Thereafter, the time hypothesis decider 205 informs the spatial processor 204 that the Ti is approved.

If the L1 is not larger than the predetermined threshold value LTH1, the time hypothesis decider 205 informs the temporal processor 203 that the Ti is not approved. The temporal processor 203 again calculates partial correlation values at the time hypothesis T(i+1). Thereafter, the spatial processor 204 and the time hypothesis decider 205 repeat the processes steps 11 and 12.

Accordingly, the spatial processor 204 obtains a plurality of estimated signature vectors which have decreasing values and increasing values for a phase angle of the specific estimated signature vector at the approved Ti where the maximum combined partial correlation values at the specific time hypothesis Ti exceed the specified threshold value LTH1. Then it combines the estimated signature vectors having the increased and decreased phase angles with the partial correlation values obtained in the temporal processor 203, determines and replaces the maximum combined partial correlation value by the value of L2 (step 13) (the second spatial process). For instance, if the maximum combined partial correlation value obtained by using the following equation, $a(\hat{\theta}_3)=[1, e^{-j\pi \sin 36}, e^{-j\pi 2 \sin 36}, K, e^{-j\pi(N-1)\sin 36}]^T$, exceeds the specified threshold value LTH1 at the specific time hypothesis Ti, the above equation ($a(\hat{\theta}_3)$) are divided into a plurality of estimated signature vectors having different phase angles and a precise search is performed using the estimated signature vectors of the following equations 3-1 to 3-5.

Then, the 36° is determined as a central phase angle, and the search is re-started with respect to the estimated signature vectors at intervals of 2° before and after the central phase angle.

$$a(\hat{\theta}_{3,1})=[1,e^{-j\pi \sin 32}, e^{-j\pi 2 \sin 32}, K, e^{-j\pi(N-1)\sin 32}]^T \quad \text{[Equation 3-1]}$$

$$a(\hat{\theta}_{3,2})=[1,e^{-j\pi \sin 34}, e^{-j\pi 2 \sin 34}, K, e^{-j\pi(N-1)\sin 34}]^T \quad \text{[Equation 3-2]}$$

$$a(\hat{\theta}_{3,3})=[1,e^{-j\pi \sin 36}, e^{-j\pi 2 \sin 36}, K, e^{-j\pi(N-1)\sin 36}]^T \quad \text{[Equation 3-3]}$$

$$a(\hat{\theta}_{3,4})=[1,e^{-j\pi \sin 38}, e^{-j\pi 2 \sin 38}, K, e^{-j\pi(N-1)\sin 38}]^T \quad \text{[Equation 3-4]}$$

$$a(\hat{\theta}_{3,5})=[1,e^{-j\pi \sin 40}, e^{-j\pi 2 \sin 40}, K, e^{-j\pi(N-1)\sin 40}]^T \quad \text{[Equation 3-5]}$$

The L2 is replaced with "$C*a(\hat{\theta}_{i,j})$". The spatial processor 204 provides the replaced value L2 to the time hypothesis decider 205. Herein, "i" denotes one among the estimated signature vectors for the signature vector estimation, and "j" denotes one estimated signature vector among the plurality of estimated signature vectors obtained on the basis of a phase angle of a specific estimated vector having the maximum combined partial correlation value. In other words, the estimated signature vectors obtained have decreasing values and increasing values for a phase angle of the specific estimated signature vector at the approved Ti.

The time hypothesis decider 205 compares the value L2 with the threshold value LTH2 (step 14). If the value L2 exceeds the threshold value LTH2, the decider 205 approves the corresponding time hypothesis Ti. The approval is to recognize the existence of a new signal path at the time hypothesis, and if the estimated signature vector has the maximum combined partial correlation value, it will be the phase information of the corresponding path. At this time, if a system including the array antenna set to perform steps 15 and 16, the time hypothesis decider 205 informs the spatial processor 204 that the Ti is approved. However, if the L2 is not larger than the predetermined threshold value LTH2, the time hypothesis decider 205 informs the temporal processor 203 that the Ti is not approved. The temporal processor 203 again calculates partial correlation values at the time hypothesis T(i+1). The spatial processor 204 and the time hypothesis decider 205 repeat the processes steps 11, 12, 13, and 14.

The beam forming module 206 forms a beam for each antenna element by applying a pre-adapted (or fixed) weight value to the partial correlation values calculated in the temporal processor 203.

A temporal tracking module 208 tracks a time-offset of a scrambling code in the searched signal path. The finger combining module 207 generates a beam by combining the formed beams of the paths existing in the approved time hypothesis based on a result of temporal tracking performed by a temporal tracking module 208. At this time, the finger combining module 207 combines at a maximum ratio the beams of the paths for the respective antenna elements based on the approved time hypothesis and the phase information. By this maximum ratio combining, the target error rate of the link channel can be improved.

Meanwhile, where an accurate search of the time hypothesis is very important, in other words, where that the Signal-to-Interference & Noise Ratio (SINR) of the receiver is less than the threshold value determined in the system, it can be assumed that the slots of the signal link channel, i.e., the up link channel or down link channel, are independent due to the characteristic of the radio channel, and thus the spatial processor 204 accumulate the combined partial correlation values for the respective antenna elements during a Q time-slots period (temporal/spatial process) for the detailed authentication of the signal path existing at the approved time hypothesis (step 15), and replace the accumulated combined partial correlation value by L3.

If the value L3 exceeds a new threshold value LTH3 (step 16), the time hypothesis decider 205 approves the corresponding time hypothesis Ti (S17). The approval is to recognize the existence of a new signal path at the time hypothesis Ti. The finger combining module 207, as described above, combines at the maximum ratio the beams of the paths for the respective antenna elements based on the approved time hypothesis and the phase information. If the L3 is not larger than the predetermined threshold value LTH3, the time hypothesis decider 205 informs the temporal processor 203 that the Ti is not approved. The temporal processor 203 again calculates partial correlation values at the time hypothesis T(i+1). The spatial processor 204 and the time hypothesis decider 205 repeat the processes steps 11, 12, 13, 14, 15, and 16.

Second Embodiment

Figure 6:
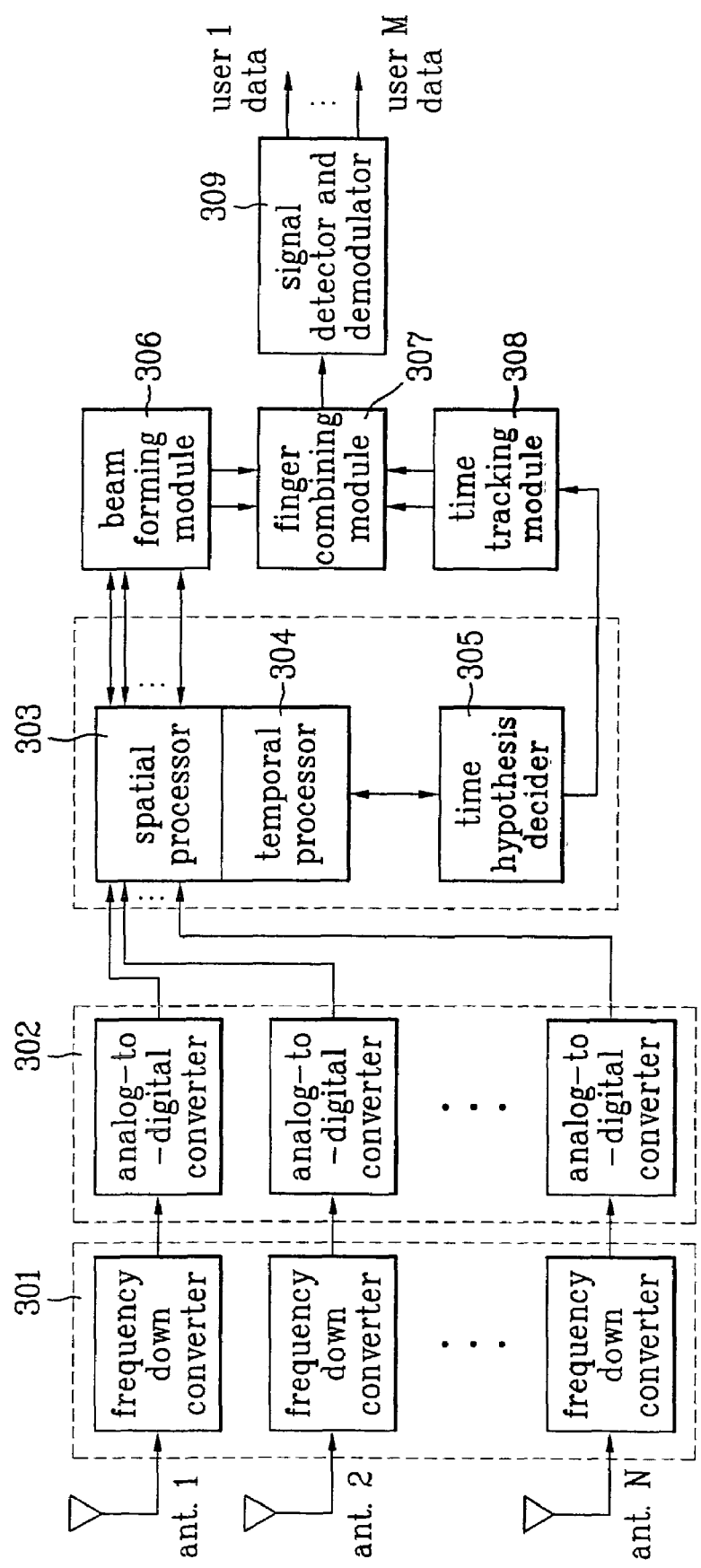
FIG. 6 is a block diagram illustrating the construction of a temporal/spatial-processing searcher according to a second embodiment of the present invention.

FIG. 6 is a block diagram illustrating the configuration of a temporal/spatial-processing searcher according -to a second embodiment of the present invention.

Figure 7:
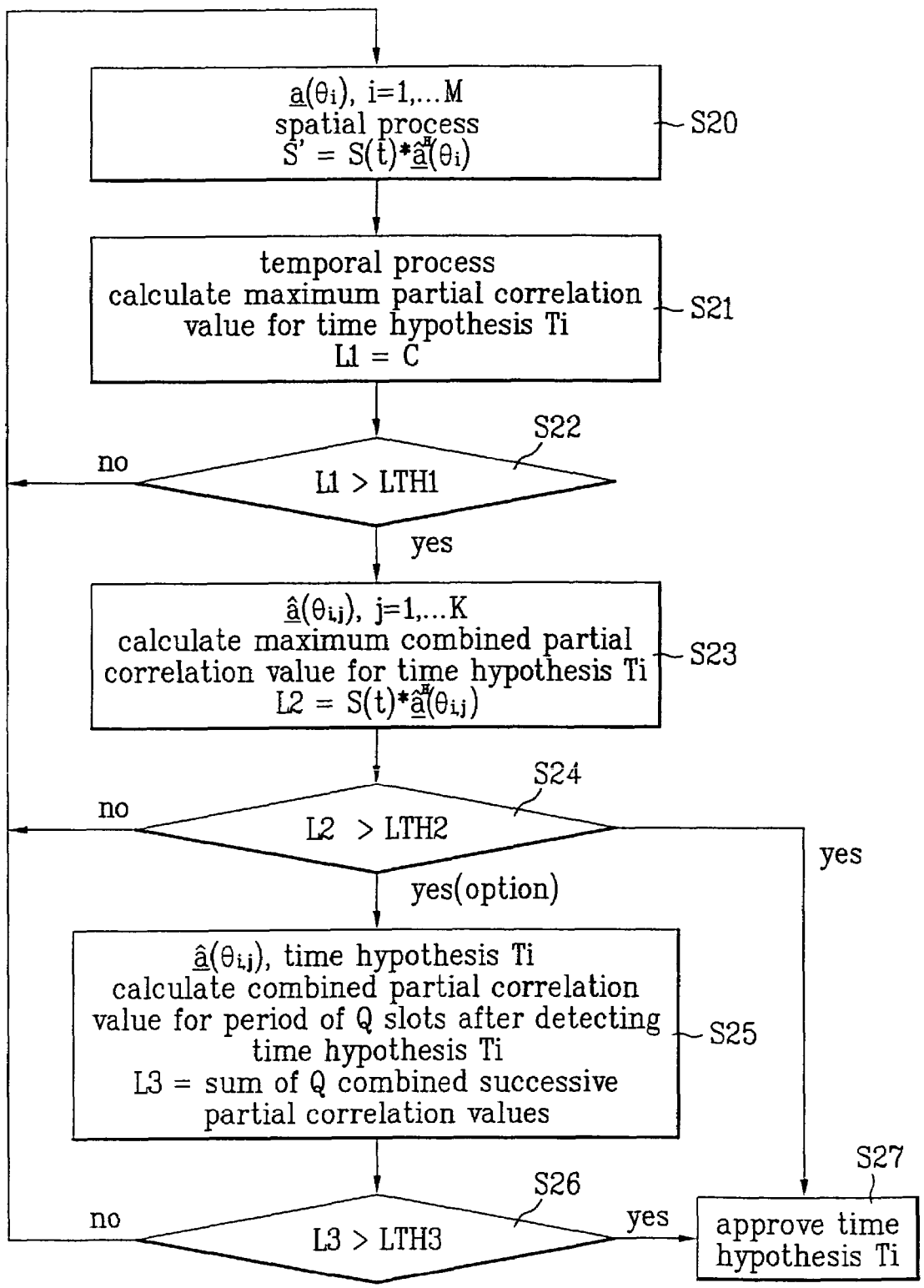
FIG. 7 is a flowchart illustrating a searching process of the temporal/spatial-processing searcher of FIG. 6.

FIG. 7 is a flowchart illustrating a searching process of the temporal/spatial-processing searcher of FIG. 6.

As shown in FIG. 6, the searcher includes a frequency down converter 301 for converting signals received by respective antenna elements into baseband signals, an analog-to-digital converter 302 for converting the analog signals of the baseband into digital signals, a spatial processor 303 for combining the digital signals, which are chip level signals before being despread, with estimated signature vectors, a temporal processor 304 for calculating partial correlation values of the combined signals and time-offset sequences of scrambling codes and determining a maximum combined partial correlation value among the partial correlation values of the combined signals, a time hypothesis decider 305 for deciding whether to approve a time hypothesis on which it is provided with the maximum combined partial correlation value, a time tracking module 308 for tracking chip level timings of the signals to be newly searched at the approved time hypothesis in the respective antenna elements, a beam forming module 306 for forming a beam by applying a pre-adapted (or fixed) weight value to the combined signals calculated in the spatial processor 303, a finger combining module 307 for generating a beam by combining the formed beams of the paths existing in the approved time hypothesis based on a result of time tracking, and a signal detector and decoder 309 for detecting and decoding an output of the finger combining module 307.

Referring to FIGS. 6 and 7, the path searching process will be explained.

First, the spatial processor 303, for the spatial process of the signals received through the respective antennas, combines the estimated signature vectors $a(\hat{\theta})$ with chip level signals of the received signals, $a(\theta)s(t)$ and generates a combined signal as the following equation 4 (step 20) (a spatial process) At this time, a plurality of estimated signature vectors are used, and given as the above-described equations 2-1 to 2-9.

$$a^H(\hat{\theta})a(\theta)s(t) \qquad \text{[Equation 4]}$$

Herein, "$a(\theta)s(t)$" is represented as S(t). "H" represents a hermitian operation.

The temporal processor 304 obtains the partial correlation values (in FIG. 7, denoted as C) of the combined signals and time-offset sequences of scrambling codes at the considered time hypothesis Ti using the equation 4, obtains the maximum value among the obtained partial correlation values, and replaces the maximum value by L1 (step 21).

If L1 exceeds the determined threshold value LTH1, the time hypothesis decider 305 assumes that there exists a new signal path at the time hypothesis Ti (step 22). Thereafter, the time hypothesis decider 305 informs the temporal processor 304 that the Ti is approved. If the L1 is not larger than the predetermined threshold value LTH1, the time hypothesis decider 305 informs the spatial processor 303 that the T1 is not approved. The spatial processor 303 again calculates the combined signals of the estimated signature vector and the chip-level signals. The temporal processor 304 and the time hypothesis decider 305 repeat the processes steps 20, 21, and 22.

In order to authenticate the time hypothesis of the new signal path candidate obtained during the above process, the spatial processor 303 enters the procedure for searching the signal path in more precision, and the estimated signature vectors used at this time are identical to those used in the temporal/spatial processing structure of FIG. 4.

That is, the temporal processor 304 obtains a plurality of estimated signature vectors which have decreasing values and increasing values for a phase angle of the specific estimated signature vector at the approved Ti where the maximum combined partial correlation values at the time hypothesis exceed the specified threshold value LTH1. Then it calculates the partial correlation values of the combined signals and the obtained estimated signature vectors, determines and replaces the maximum combined partial correlation value by the value of L2 (step 23) (the second spatial process).

For instance, if exceeds the threshold value LTH1 appears in the following equation, $$a(\hat{\theta}_3) = [1, e^{-j\pi \sin 3\hat{\theta}}, e^{-j\pi 2 \sin 3\hat{\theta}}, K, e^{-j\pi(N-1)\sin 3\hat{\theta}}]^T,$$

The temporal processor 304 performs the second temporal process for the combined signals to which the estimated signature vectors of the equations 3-1 to 3-5 are applied at the corresponding time hypothesis Ti. The result of the temporal process is as shown in the equation 4. This temporal process result is called the combined partial correlation value. The L2 is replaced by "$C*a^H(\hat{\theta}_{i,j})$". The temporal processor 304 provides the replaced value L2 to the time hypothesis decider 305. Herein, "i" denotes one among the estimated signature vector for the signature vector estimation, and "j" denotes one estimated signature vector among the estimated signature vector divided based on a specific estimated signature vector having the maximum combined partial correlation value.

If the value L2 exceeds a determined threshold value LTH2, the time hypothesis decider 305 approves the corresponding time hypothesis. The approval is to recognize the existence of a new signal path at the time hypothesis as described above, and if the signature vector estimated value has the maximum combined partial correlation value, it will be the phase information of the corresponding path. At this time, if a system including the array antenna set to perform steps 25 and 26, the time hypothesis decider 305 informs the temporal processor 304 that the Ti is approved. However, if the L2 is not larger than the predetermined threshold value LTH2, the time hypothesis decider 305 informs the spatial processor 303 that the Ti is not approved. The spatial processor 303 again calculates combined signals at the time hypothesis T(i+1). The temporal processor 304 and the time hypothesis decider 305 repeat the processes steps 20, 21, and 23. The beam forming module 306 forms a beam for each antenna element by applying a pre-adapted (or fixed) weight value to the combined signals from the spatial processor 303. A temporal tracking module 308 tracks a time-offset of a scrambling code in the searched signal path.

The finger combining module 307 generates a beam by combining the formed beams of the paths existing in the approved time hypothesis based on a result of temporal tracking performed by a temporal tracking module 308. At this time, the finger combining module 307 combines at a maximum ratio the beams of the paths for the respective antenna elements based on the approved time hypothesis and the phase information. By this maximum ratio combining, the target error rate of the link channel can be improved.

Meanwhile, where an accurate search of the time hypothesis is very important, in other words, where the SINR of the receiver is less than the threshold value determined in the system, it can be assumed that the slots of the signal link channel, i.e., the up link channel or down link channel, are independent due to the characteristic of the radio channel, and thus the temporal processor 304 accumulate the combined partial correlation values for the respective antenna elements for a Q time-slots period (temporal/spatial process) for the detailed authentication of the signal path existing at the approved time hypothesis (step 25), and replace the accumulated combined partial correlation value by L3.

If the value L3 exceeds a new threshold value LTH3 (step 26), the time hypothesis decider 305 approves the corresponding time hypothesis Ti (step 27). The approval is to recognize the existence of a new signal path at the time hypothesis Ti. The finger combining module 307, as described above, combines at the maximum ratio the beams of the paths for the respective antenna elements based on the approved time hypothesis and the phase information. If the L3 is not larger than the predetermined threshold value LTH3, the time hypothesis decider 305 informs the spatial processor 303 that the Ti is not approved. The spatial processor 303 again calculates the combined signals at the time hypothesis T(i+1). The temporal processor 304 and the time hypothesis decider 305 repeat the processes steps 20, 21, 22, 23, 24, and 25.

As described above, in the second embodiment of the present invention, the transmission delay difference of the multi-path signals through the respective antenna elements is almost '0', and if one signal makes an effect on the others as a destructive interference in the different signal paths, these signals can be separated into each of signals belonging to an independent path.

Also, in the second embodiment, the first spatial process, the temporal process, and the second spatial process can be performed in a period of one slot.

In addition, according to the second embodiment, for the authentication process for a period of Q slots, a time for Q slots is required, and the whole process according to the second embodiment for rapid search for a new path can be performed in a period of (1+Q) slots.

As described above, according to the present invention, since it is possible that the deterioration of the expected search performance in case of searching the path for the respective antenna elements is prevented and the interference signal is suppressed, the performance of the searcher can be greatly improved in the environment where the interference of the multi-user exists.

Consequently, the performance of the rake receiver can be improved.

Also, it becomes possible to search the path that causes the destructive interference with the same delay. Though such a path combination is impossible in a typical rake receiver, the maximum ratio combination of the signals that can be spatially separated is possible using the searcher using the spatial information, and thus the performance of the rake receiver can be improved in a severe radio channel environment.

It will be apparent to those skilled in the art than various modifications and variations can be made in the present invention. Thus, it is intended that the present invention covers the modifications and variations of this invention provided they come within the scope of the appended claims and their equivalents.

What is claimed is:

1. A signal path searching method in a mobile communication system provided with a plurality of array antenna elements, the method comprising:

applying partial correlation values of despread signals to first phase information values estimated for signal path estimation;

deciding if a first maximum value among the partial correlation values to which the first phase information values are applied exceeds a first threshold value;

if it is decided that the first maximum value exceeds the first threshold value, applying the partial correlation values to second phase information values based on a first phase information value producing the first maximum value, wherein the second phase information values are an integer multiples of a phase angle; and searching a new signal path according to the comparison of a second maximum value among the partial correlation values to which the second phase information values are applied and a second threshold value.

2. The method of claim 1, further comprising:

if the second maximum value exceeds the second threshold value, accumulating the partial correlation values to which the second phase information values are applied during a plurality of time-slots period; and confirming the new signal path by comparing the accumulated value with a third threshold value.

3. The method of claim 1, wherein the second phase information values are integer multiples of 12 degrees.

4. The method of claim 1, wherein the second phase information values are at intervals of before and after 2 degrees based on a specified phase angle.

5. A signal path searching method in a mobile communication system provided with a plurality of array antenna elements, the method comprising:

applying spread signals to first phase information values estimated for path estimation;

deciding if a first maximum value among partial correlation values of the spread signals to which the first phase information values are applied exceeds a first threshold value;

if it is decided that the first maximum value exceeds the first threshold value, applying the spread signals to second phase information values based on a first phase information value producing the first maximum value, wherein the second phase information values are integer multiples of a phase angle; and searching a new signal path according to the comparison of a second maximum value among partial correlation values of the spread signals to which the second phase information values are applied and a second threshold value.

6. The method of claim 5, further comprising:

if the second maximum value exceeds the second threshold value, accumulating the partial correlation values of the spread signals to which the second phase information values are applied during a plurality of time-slots period; and confirming the new signal path by comparing the accumulated value with a third threshold value.

7. The method of claim 5, wherein the second phase information values are integer multiples of 12 degrees.

8. The method of claim 6, wherein the second phase information values are at intervals of before and after 2 degrees based on a specified phase angle.

9. A signal path searching method in a mobile communication system provided with a plurality of array antenna elements, the method comprising:

applying partial correlation values of despread signals to first phase information values estimated for signal path estimation at a specific time;

deciding if a first maximum value among the partial correlation values to which the first phase information values are applied exceeds a first threshold value;

if it is decided that the first maximum value exceeds the first threshold value, applying the partial correlation values to second phase information values based on a first phase information value producing the first maximum value;

deciding if a second maximum value among the partial correlation values to which the second phase information values are applied exceeds a second threshold value;

if it is decided that the second maximum value exceeds the second threshold value, accumulating the partial correlation values to which the second phase information values are applied during a plurality of time-slots period; and confirming a new signal path at the specific time by comparing the accumulated value with a third threshold value.

10. A signal path searching method in a mobile communication system provided with a plurality of array antenna elements, the method comprising:

applying spread signals to first phase information values estimated for path estimation at a specific time;

deciding if a first maximum value among partial correlation values of the spread signals to which the first phase information values are applied exceeds a first threshold value;

if it is decided that the first maximum value exceeds the first threshold value, applying the spread signals to second phase information values based on a first phase information value producing the first maximum value;

deciding if a second maximum value among the partial correlation values of the spread signals to which the second phase information values are applied exceeds a second threshold value;

if the second maximum value exceeds the second threshold value, accumulating the partial correlation values of the spread signals to which the second phase information values are applied during a plurality of time-slots period; and confirming a new signal path at the specific time by comparing the accumulated value with a third threshold value.

11. A signal path searching method in a mobile communication system provided with a plurality of array antenna elements, the method comprising:

processing temporally despread signals of signals received through the antenna elements at a specific time;

spatially processing the temporally processed signals by using first estimated phase information values and second estimated phase information values, wherein the second estimated phase information are increasing and/or decreasing for one among the first estimated phase information values, searching a signal path existing at the specific time where each maximum value for the first and second phase information values among the spatially processed signals' values exceeds a corresponding threshold value, wherein if it is decided that a maximum value among the spatially processed signals' values for the second phase information values exceed a predetermined threshold value, accumulating the spatially processed signals' values for the second phase information values during a plurality of time-slots period; and confirming a new signal path by comparing the accumulated value with a corresponding threshold value.

12. A signal path searching method in a mobile communication system provided with a plurality of array antenna elements, the method comprising:

processing spatially chip-level signals of signals received through the antenna elements by using first estimated phase information values and second estimated phase information values at a specific time, wherein the second estimated phase information values are increased or decreased from one of the first estimated phase information values;

temporally processing the spatially processed signals for each of the first and second phase information values at the specific time;

searching a signal path existing at the specific time where a maximum value for each of the first and second phase information values among the temporally processed signals' values exceeds a corresponding threshold value, wherein if it is decided that a maximum value among the temporally processed signals' values for the second phase information values exceed a predetermined threshold value, accumulating the temporally processed signals' values for the second phase information values during a plurality of time-slots period; and confirming a new signal path by comparing the accumulated value with a corresponding threshold value.

13. A signal path searching apparatus in a mobile communication system provided with a plurality of array antenna elements, the apparatus comprising:

a temporal processor for processing temporally despread signals of signals received through tile antenna elements at a specific time;

a spatial processor for spatially processing the temporally processed signals by using first estimated phase information values and second estimated phase information values, wherein the second estimated phase information values are increased or decreased from one of the first estimated phase information values; and a combiner for combining formed beams of signal paths searched at the specific time where each maximum value for the first and second phase information values among the spatially processed signals' values exceeds a corresponding threshold value, wherein if a maximum value for the second phase information values among the spatially processed signals' values exceeds a predetermined threshold values, the spatial processor accumulates the spatially processed signals' values for the second phase information values during a plurality of time-slots period, the combiner combines the formed beams of the signal paths confirmed by comparing the accumulated value with a corresponding threshold value.

14. A signal path searching apparatus in a mobile communication system provided with a plurality of array antenna elements, the apparatus comprising:
  a spatial processor processing spatially chip-level signals of signals received through the antenna elements by using first estimated phase information values and second estimated phase information values at a specific time, wherein the second estimated phase information values are increased or decreased from one of the first estimated phase information values;
  a temporal processor for temporally processing the spatially processed signals by using the first estimated phase information values and the second estimated phase information values at a specific time; and
  a combiner for combining formed beams of signal paths searched at the specific time where each maximum value for the first and second phase information values among the temporally processed signals' values exceeds a corresponding threshold value, wherein if a maximum value for the second phase information values among the temporally processed signals' values exceeds a predetermined threshold values, the temporal processor accumulates the temporally processed signals' values for the second phase information values during a plurality of time-slots period, the combiner combines the formed beams of signal paths confirmed at the specific time by comparing the accumulated value with a corresponding threshold value.

15. A signal path searching apparatus in a mobile communication system provided with a plurality of array antenna elements, the apparatus comprising:
  a temporal processor for calculating partial correlation values of despread signals of signals received the antenna elements at a specific time;
  a spatial processor for applying the partial correlation values to first estimated phase information values and second estimated phase information values estimated for signal path estimation, wherein the second estimated phase information values are increased or decreased from one of the first estimated phase information values;
  a time hypothesis decider for deciding if a maximum value for each of the first and second phase information values among the partial correlation values to which the first estimated phase information values and the second estimated phase information values are respectively applied exceeds a corresponding threshold value; and
  a combiner for combining formed beams of the signal paths searched according to an output of the time hypothesis decider at the specific time, wherein the spatial processor accumulates the partial correlation values with the second phase information values during a plurality of time-slots period and the time hypothesis decider further decides if the accumulated value exceeds a predetermined threshold value.

16. The apparatus of claim 15, wherein the second phase information values are integer multiples of a certain phase angle.

17. The apparatus of claim 16, wherein the second phase information values are integer multiples of 12 degrees.

18. The apparatus of claim 15, wherein the second phase information values are at intervals of before and after 2 degrees based on a specified phase angle.

19. A signal path searching apparatus in a mobile communication system provided with a plurality of array antenna elements, the apparatus comprising:
  a spatial processor for applying spread signals to first phase information values and second phase information values estimated for path estimation at a specific time, wherein the second estimated phase information values are increased or decreased from one of the first estimated phase information values;
  a temporal processor for obtaining partial correlation values of the spread signals to which the first phase information values and the second phase information values are respectively applied;
  a time hypothesis decider for deciding if each maximum value for the first and second phase information values among the temporally processed signals' values exceeds a corresponding threshold value; and
  a combiner for combining formed beams of the signal paths searched according to an output of the time hypothesis decider at the specific time, wherein the temporal processor accumulates the partial correlation values of signals with the second phase information values during a plurality of time-slots, and the time hypothesis decider further decides if the accumulated value exceeds a prescribed threshold value.

20. The apparatus of claim 19, wherein the second phase information values are integer multiples of a certain phase angle.

21. The apparatus of claim 20, wherein the second phase information values are integer multiples of 12 degrees.

22. The apparatus of claim 19, wherein the second phase information values are at intervals of before and after 2 degrees based on a specified phase angle.

* * * * *